(12) United States Patent
Kim

(10) Patent No.: US 9,259,977 B2
(45) Date of Patent: Feb. 16, 2016

(54) TIRE PRESSURE DETECTING MODULE AND TIRE PRESSURE DETECTING SYSTEM COMPRISING THE SAME

(71) Applicant: Hyundai Autron Co., Ltd., Seongnam-si (KR)

(72) Inventor: Kyung-Taek Kim, Anyang (KR)

(73) Assignee: Hyundai Autron Co., Ltd., Seongnam-si (KR)

( * ) Notice: Subject to any disclaimer, the term of this patent is extended or adjusted under 35 U.S.C. 154(b) by 119 days.

(21) Appl. No.: 14/135,432

(22) Filed: Dec. 19, 2013

(65) Prior Publication Data

US 2014/0176324 A1 Jun. 26, 2014

(30) Foreign Application Priority Data

Dec. 21, 2012 (KR) ........................ 10-2012-0150217

(51) Int. Cl.
*B60C 23/04* (2006.01)
(52) U.S. Cl.
CPC ......... *B60C 23/0416* (2013.01); *B60C 23/0462* (2013.01); *B60C 23/0489* (2013.01)
(58) Field of Classification Search
CPC ............ B60C 23/0416; B60C 23/0489; B60C 23/0462
USPC .................... 340/442, 447; 73/45.6, 49, 146.5
See application file for complete search history.

(56) References Cited

U.S. PATENT DOCUMENTS

| 5,473,938 A * | 12/1995 | Handfield et al. ............ 73/146.5 |
| 2011/0087396 A1* | 4/2011 | Eregen et al. .................... 701/29 |
| 2014/0184403 A1* | 7/2014 | Kosugi et al. ................. 340/447 |
| 2015/0057878 A1* | 2/2015 | Friel et al. ..................... 701/34.4 |

FOREIGN PATENT DOCUMENTS

| KR | 2002-0050061 A | 6/2002 |
| KR | 10-0584335 B1 | 5/2006 |

* cited by examiner

*Primary Examiner* — Daniel Wu
(74) *Attorney, Agent, or Firm* — Morgan, Lewis & Bockius LLP

(57) ABSTRACT

Provided are a tire pressure detecting module that simply identifies a position of a tire detecting module to automatically assign the position of the tire detecting module and a tire pressure detecting system including the same. The tire pressure detecting module includes a phase angle sensor detecting a phase angle of a wheel, a pressure detecting sensor detecting a pressure and temperature of a tire, a pressure detecting control unit extracting a phase angle number matching a phase angle of the wheel that is detected by the phase angle sensor among a plurality of phase angle numbers that are given by uniformly dividing the wheel, and a pressure detecting transmission part transmitting tire information including a pressure value or temperature value detected by the pressure detecting sensor at the retransmission interval several times.

7 Claims, 3 Drawing Sheets

| UNIQUE IDENTIFIER | INPUT VALUE | VOLTAGE VALUE | TEMPERATURE VALUE | RETRANSMISSION NUMBER | CHECKSUM |

TIRE PRESSURE DETECTING MODULE AND TIRE PRESSURE DETECTING SYSTEM COMPRISING THE SAME

CROSS-REFERENCE TO RELATED APPLICATION

This application claims priority to Korean Patent Application No. 10-2012-0150217 filed on Dec. 21, 2012 and all the benefits accruing therefrom under 35 U.S.C. §119, the contents of which are incorporated by reference in their entirety.

BACKGROUND

The present invention disclosed herein relates to a tire pressure detecting module and a tire pressure detecting system including the same, and more particularly, to a tire pressure detecting module and a tire pressure detecting system including the same, in which a position of the tire pressure detecting module is simply identified and automatically assigned.

A tire pressure detecting system is a system enabling a driver to check a pressure state of a tire in real time by detecting a pressure and/or temperature of a tire and then transmitting the detected pressure and/or temperature to a driver's seat.

An extremely high or low air pressure of an automobile tire is likely to cause a tire to be punctured or a vehicle to easily skid, thus leading to big accident. Also, fuel consumption increases to deteriorate fuel efficiency, a service life of a tire is shortened, and also ride comfort and braking force becomes poor.

A safety device installed on a vehicle to prevent defects in a tire is a tire pressure detecting system. The tire pressure detecting system is configured such that a tire pressure detecting sensor installed on a wheel measures a pressure and/or temperature inside a tire and wirelessly transmits the measured information. However, during first installation, replacement or position change of a wheel or tire, it is difficult to identify which tire pressure detecting sensor transmits the pressure and/or temperature information that is wirelessly received.

SUMMARY

The present invention provides a tire pressure detecting module and a tire pressure detecting system including the same, in which a position of the tire pressure detecting module is simply identified and automatically assigned.

Objects of the present invention are not limited to the above, and thus other objects not described herein could be clearly understood by a person skilled in the art from the following disclosure.

In accordance with an exemplary embodiment of the present invention, a tire pressure detecting module includes: a phase angle sensor detecting a phase angle of a wheel; a pressure detecting sensor detecting a pressure and temperature of a tire; a pressure detecting control unit extracting a phase angle number matching a phase angle of the wheel that is detected by the phase angle sensor among a plurality of phase angle numbers that are given by uniformly dividing the wheel; and a pressure detecting transmission part transmitting tire information including a pressure value or temperature value detected by the pressure detecting sensor at the retransmission interval several times.

Details of other embodiments are included in the detailed description and drawings.

BRIEF DESCRIPTION OF THE DRAWINGS

Exemplary embodiments can be understood in more detail from the following description taken in conjunction with the accompanying drawings, in which.

Exemplary embodiments can be understood in more detail from the following description taken in conjunction with the accompanying drawings, in which.

DETAILED DESCRIPTION OF EMBODIMENTS

Figure 1:
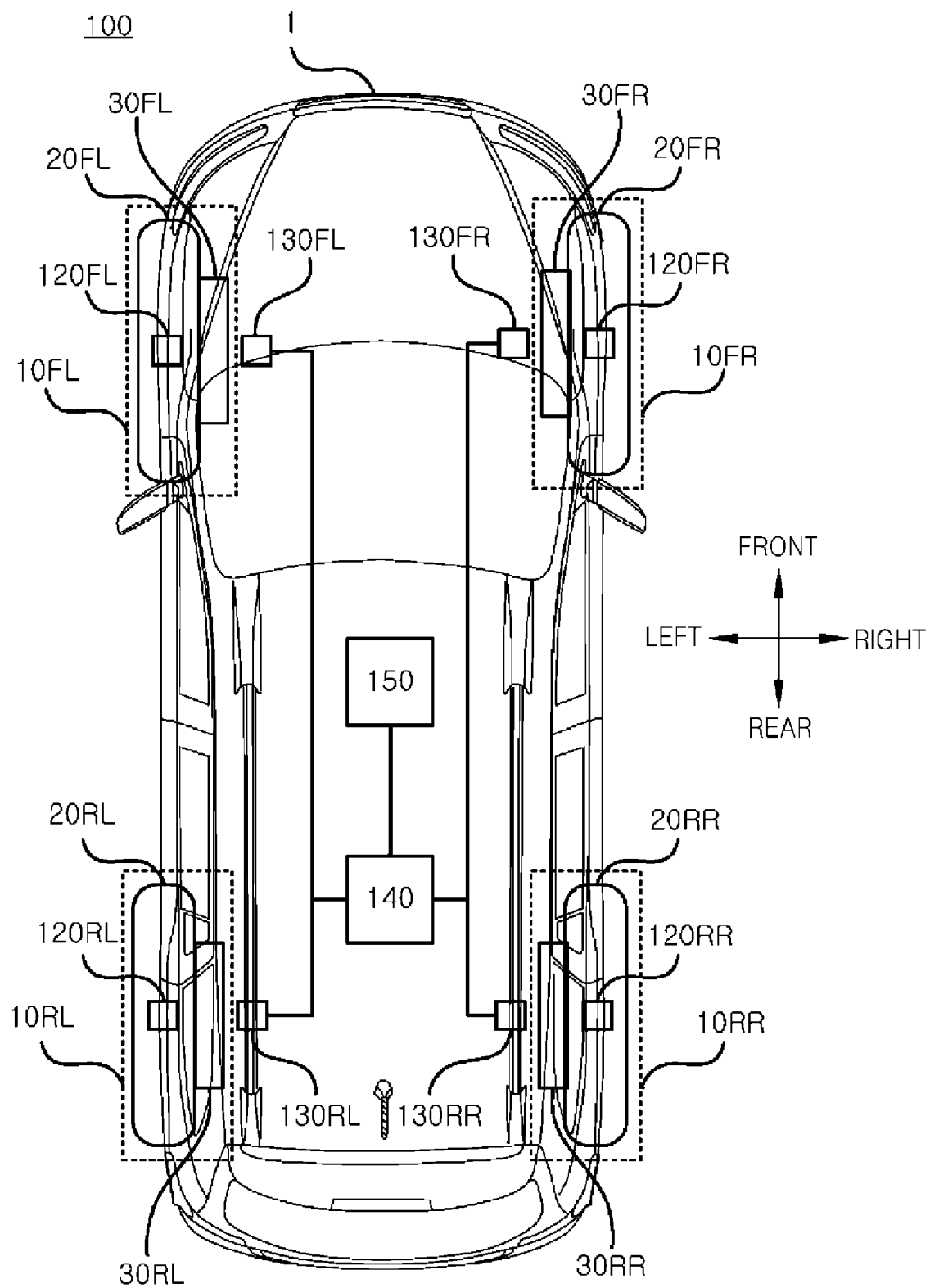
FIG. 1 illustrates a tire pressure detecting system in accordance with an embodiment of the present invention.

Advantages and features of the present invention, and implementation methods thereof will be clarified through following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. Like reference numerals refer to like elements throughout.

The suffix "module" and "unit" for components, which are used in the description below, are assigned and mixed in consideration of only the easiness in writing the specification. That is, the suffix itself does not have different meanings or roles.

It is to be understood that each block of the block diagrams and flowcharts can be implemented by computer program instructions. The computer program instructions may be mounted on a general purpose computer or processor, special purpose computer or processor, or other programmable data processing apparatus to produce a machine or device. Execution of the instructions on the computer or other programmable data processing apparatus provides a means for implementing functions depicted in the diagrams and/or flowcharts. These computer program instructions are possible to be stored in a computer available or computer readable memory aiming at a computer or a programmable data processing equipment so as to implement functions with a specific method. Accordingly, the instructions stored in the computer available or computer readable memory are possible to create manufactured items including the instruction means performing functions explained in the flowchart block(s). Computer program instructions may be installed in a computer or programmable data processing equipment. Accordingly, the instructions, which create a process which is executed by a computer after a series of motion steps are performed in a computer or programmable data processing equipments to operate a computer or programmable data processing equipments, may provide steps for executing functions explained in flowchart block(s).

Moreover, each block can indicate a part of module, segment, or code including one or more executable instructions for executing specific logical function(s). In addition, it should be noted that, in some execution examples, the functions mentioned in blocks may be executed in another order. For example, two blocks which are consecutively drawn may be substantially simultaneously performed or may be performed in reverse order according to a corresponding function.

Hereinafter, the present invention will be described through embodiments thereof, with reference to drawings for illustrating a tire pressure detecting module and a tire pressure detecting system including the same.

FIG. 1 illustrates a tire pressure detecting system in accordance with an embodiment of the present invention;

A tire pressure detecting system 100 in accordance with an embodiment of the present invention includes a tire pressure detecting module 120, a wheel rotation detecting module 130, a tire information receiving module 150, and a control unit 140. The tire pressure detecting module 120 detects a pressure and/or temperature of a tire 20 and wirelessly transmits tire information including a pressure value and/or temperature value and other information. The wheel rotation detecting module 130 detects rotation information of a wheel 10. The tire information receiving module 150 wirelessly receives the tire information transmitted from the tire pressure detecting module 120. The control unit receives the rotation information of the wheel 10 from the wheel rotation detecting module 130, receives the tire information from the tire information receiving module 150, and automatically assigns a position of the tire pressure detecting module 120.

In generally, the wheel 10 of a vehicle is provided in plurality. In the present embodiment, the wheel 10 includes an FR wheel 10FR disposed at a front right side of a vehicle body 1, an FL wheel 10FL disposed at a front left side, an RR wheel 10RR disposed at a rear right side, and an RL wheel 10RL disposed at a rear left side. Number of the wheel 10 may vary with embodiments.

The tire 20 is mounted on an outer circumference of the wheel 10 of the vehicle and formed of a rubber material. The tire 20 is mounted on a rim of the wheel 10. The tire 20 is provided in plurality, and, in the present embodiment, the tire 20 includes an FR tire 20FR disposed at a front right side of the vehicle body 1, an FL tire 20FL disposed at a front left side, an RR tire 20RR disposed at a rear right side, and an RL tire 20RL disposed at a rear left side. The FR tire 20FR is included in the FR wheel 10FR; the FL tire 20FL is included in the FL wheel 10FL; the RR tire 20RR is included in the RR wheel 10RR; and the RL tire 20RL is included in the RL wheel R0FL.

The tire pressure detecting module 120 detects a pressure and/or temperature of the tire 20 for identifying a level of an air pressure of the tire 20. The tire pressure detecting module 120 may calculate the air pressure of the tire 20, or detect other information such as pressure and temperature which allows the level of the air pressure to be identified. In the present embodiment, the tire pressure detecting module 120 detects the pressure and temperature of the tire 20.

The tire pressure detecting module 120 may be installed at various positions, for example, at a rim of the wheel 10 or a side of the tire 20. The tire pressure detecting module 120 is provided in plurality. In the present embodiment, the tire pressure detecting module 120 includes an FR tire pressure detecting module 120FR disposed at a front right side of the vehicle body 1, an FL tire pressure detecting module 120FL disposed at a front left side, an RR tire pressure detecting module 120RR disposed at a rear right side, and an RL tire pressure detecting module 120RL disposed at a rear left side. In the present embodiment, the FR tire pressure detecting module 120FR detects a pressure and temperature of the FR tire 20FR, the FL tire pressure detecting module 120FL detects a pressure and temperature of the FL tire 20FL, the RR tire pressure detecting module 120RR detects a pressure and temperature of the RR tire 20RR, and the RL tire pressure detecting module 120RL detects a pressure and temperature of the RL tire 20RL.

The tire pressure detecting module 120 detects a phase angle of the wheel 10 along with the pressure and/or temperature of the tire 20. Each of the plurality of tire pressure detecting modules 120 may have a unique identifier that is a unique number for distinguishing it from the other tire pressure detecting module 120. The plurality of tire pressure detecting module 120 may wirelessly transmit tire information including the detected tire pressure value and/or temperature value and the unique identifier to the tire information receiving module 150.

The tire pressure detecting module 120 extracts a phase angle number matching the detected phase angle of the wheel 10 among a plurality of phase angle numbers which are given by uniformly dividing the wheel 10 and calculates a retransmission interval from the detected phase angle number to retransmit tire information including the detected pressure value or temperature value several times. Descriptions with respect to the tire pressure detection module 120 will be described below with reference to FIG. 2.

The wheel rotation detecting module 130 detects rotation information of the wheel 10, which indicates a degree of rotation of the wheel 10. The wheel rotation detecting module 130 is disposed on the wheel 10 or the vehicle body 1 to detect the rotation information of the wheel 10 through various methods.

In the present embodiment, teeth are disposed on a disc 30 of the wheel 10 that rotates together with the tire 20. Thus, the wheel rotation detecting module 130 detects the passing teeth of the disc 30 to output the detected result as the rotation information of the wheel 10. The wheel rotation detection module 130 provides a signal for detecting the passing teeth of the disc 30 and generates a pulse when the teeth pass, and portions on which the teeth are not disposed pass. In the present embodiment, the number of pulses generated by the wheel rotation detecting module 130 may be the rotation information of the wheel 10. Various sensors such as a photo sensor, an inductive sensor, and a hall effect sensor which are capable of detecting the passing teeth may be used as a sensor for the wheel rotation detecting module 130.

The teeth of the disc 30 may have a preset number. The number of teeth may vary according to a kind of vehicle or wheel 10. Thus, when the wheel 10 makes one revolution, the number of pulses generated by the wheel rotation detecting module 130 may be changed. In the present embodiment, 48 teeth may be provided on the disc 30. Thus, the wheel rotation detecting module 130 generates 96 pulses when the wheel 10 makes one revolution.

The wheel rotation detecting module 130 detects the number of passing teeth at a predetermined time point to output pulse numbers corresponding thereto. If the number of pulses generated by the wheel rotation detecting module 130 when the wheel 10 makes one revolution is N-pul, the number $N\_sh$ of pulses outputted from the wheel rotation detecting module 130 when the wheel rotates by an angle P from a predetermined position may be as follows.

Number of pulse $N\_sh=N\_pul*(P/360 \text{ degrees})$

For example, when the wheel 10 rotates at an angle of about 45 degrees, the wheel rotation detecting module 130 may output 12 pulses.

Although the wheel rotation detecting module 130 is separately provided for the tire pressure detecting system 100, the wheel rotation detecting module 130 may be a part of an anti-lock brake system (ABS) of the vehicle.

The wheel rotation detecting module 130 is provided in plurality. In the present embodiment, the wheel rotation detecting module 130 includes an FR wheel rotation detecting module 130FR disposed at a front right side of the vehicle body 1, an FL wheel rotation detecting module 130FL disposed at a front left side of the vehicle body 1, an RR wheel rotation detecting module 130RP disposed at a rear right side of the vehicle body 1, and an RL wheel rotation detecting module 130RL disposed at a rear left side of the vehicle body 1. Also, the disc 30 is provided in plurality. The disc 30 includes an FR disc 30FR disposed at a front right side of the vehicle body 1, an FL disc 30FL disposed at a front left side of the vehicle body 1, an RR disc 30RR disposed at a rear right side of the vehicle body 1, and an RL disc 30RL disposed at a rear left side of the vehicle body 1. The FR wheel rotation detecting module 130FR detects rotation information of the FR disc 30FR of the FR wheel 10FR, the FL wheel rotation detecting module 130FL detects rotation information of the FL disc 30FL of the FL wheel 10FL, the RR wheel rotation detecting module 130RR detects rotation information of the RR disc 30RR of the RR wheel 10RR, and the RL wheel rotation detecting module 130RL detects rotation information of the RL disc 30RL of the RL wheel 10RL.

The plurality of wheel rotation detecting modules 130 transmit the rotation information of each of the plurality of wheels 10 to the control unit 140. Each of the plurality of wheel rotation detecting modules 130 is connected to the control unit 140 through a wire. Each of the plurality of wheel rotation detecting modules 130 may be connected to the control unit 140 through a controller area network (CAN).

The tire information receiving module 150 wirelessly receives the tire information, which is transmitted several times at the retransmission interval from the tire pressure detecting module 120, several times. The tire information receiving module 150 is provided in the vehicle body 1 to receive the tire information from each of the plurality of tire pressure detecting modules 120 several times.

The tire information receiving module 150 transmits the tire information that is received several times to the control unit 140 several times. The tire information receiving module 150 may be included in the control unit 140 in accordance with embodiments.

The control unit 140 receives the rotation information of each of plurality of wheels 10 from the plurality of wheel rotation detecting modules 130. The control unit 140 stores the rotation information of each of the plurality of wheels 10 transmitted at a predetermined time point according to a time.

The control unit calculates a phase angle number from a receiving interval of the plurality of tire information transmitted from the tire information receiving module 150 and determines a position of the tire pressure detecting module 120 from the phase angle number and the rotation information of the wheel 10 transmitted from the wheel rotation detecting module 130.

Although the control unit 140 is separately provided for the tire pressure detecting system 100, the control unit 140 may be an electronic control unit (ECU) for controlling states of a vehicle engine, an automatic transmission, and the ABS.

The control unit 140 determines which one of the plurality of tire pressure detecting module 120 transmits the tire information transmitted from the tire information receiving module 150 and then stores the determined result. The control unit 140 determines which one of the FR tire 20, the FL tire 20, the RR tire 20, and the RL tire 20 corresponds to the tire information.

The control unit 140 determines whether one of the unique identifiers of the RF tire pressure detecting module 120FR, the FL tire pressure detecting module 120FL, the RR tire pressure detecting module 120RR, and the RL tire pressure detecting module 120RL corresponds to the unique identifier inclined in the tire information to store the determined result.

Detailed descriptions with respect to a position assignment method of the control unit 140 will be described below with reference to FIG. 5.

Figure 2:
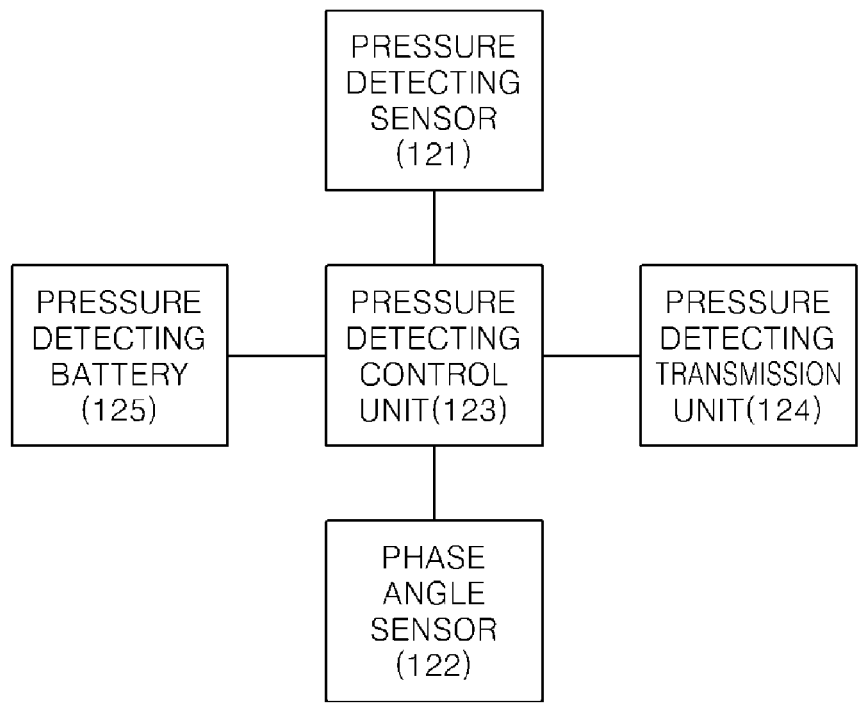
FIG. 2 is a block diagram illustrating a tire pressure detecting module in accordance with an embodiment of the present invention.
Figure 3:
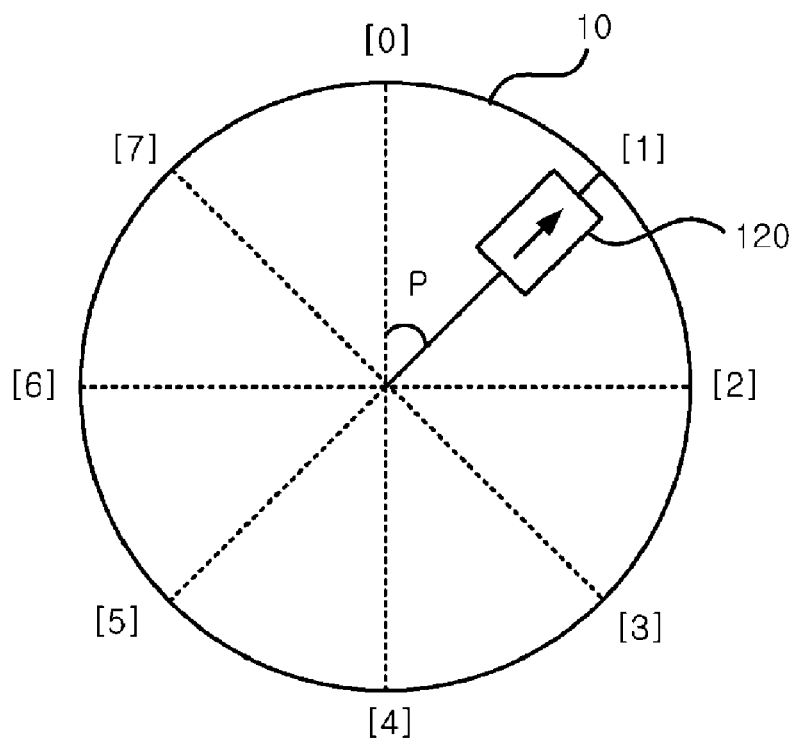
FIG. 3 illustrates a transmission position resolution of the tire pressure detecting module in accordance with an embodiment of the present invention.
Figures 4, 5:
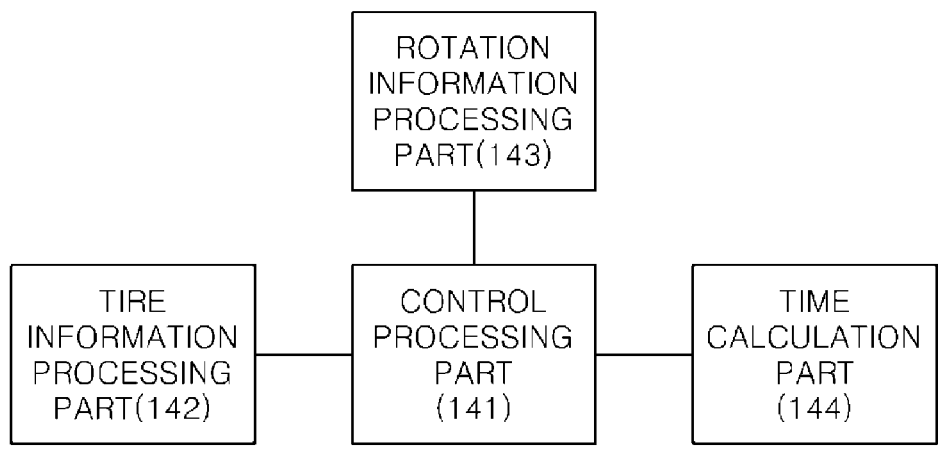
FIG. 4 is a view showing a configuration of tire information in accordance with an embodiment of the present invention.
FIG. 5 is a block diagram of a control unit in accordance with an embodiment of the present invention.

FIG. 2 is a block diagram illustrating a tire pressure detecting module in accordance with an embodiment of the present invention, FIG. 3 illustrates a transmission position resolution of the tire pressure detecting module in accordance with an embodiment of the present invention, and FIG. 4 is a view showing a configuration of tire information in accordance with an embodiment of the present invention.

The tire pressure detecting module 120 in accordance with an embodiment of the present invention includes a pressure detecting sensor 121 for detecting a pressure and/or temperature of the tire 20, a phase angle sensor 122 for detecting a phase angle of the wheel 10, a pressure detecting control unit 123 for extracting a phase angle number matching a phase angle of the wheel 10 detected by the phase angle sensor 122 among a plurality phase angle numbers that are given by uniformly dividing the wheel 10 to calculate a retransmission interval from the extracted phase angle number, and a pressure detecting transmission unit 124 for wirelessly transmitting the tire information several times at the retransmission interval that is calculated by the pressure detecting control unit 123.

The pressure detecting sensor 121 detects a pressure and/or temperature of the tire 20. The pressure detecting sensor 121 may measure the pressure/or temperature of the tire 20 through various methods to measure an air pressure of the tire 20. The pressure value and/or temperature value of the tire 20 measured by the pressure detecting sensor 121 are (is) transmitted to the pressure detecting control unit to convert an analog signal into a digital signal.

The phase angle sensor 122 detects a phase angle of the wheel 10. The phase angle sensor 122 may detect a phase angle of the tire 20 of the wheel 10, a phase angle of the rim of the wheel 10, or a phase angle of the tire pressure detecting module 120 installed on the wheel 10.

The phase angle sensor 122 may calculate an accurate phase angle from a reference point when the wheel 10 rotates. However, in accordance with embodiments, the phase angle sensor 122 may measure a phase angle displacement for a preset time when the wheel 10 rotates or output a signal when the wheel 1 rotates to reach a specific phase angle.

The phase angle sensor 122 may output an electrical signal according to a gravitational change, an electrical signal according to a acceleration change, or a signal when impacts against the ground occur. A piezoelectric sensor, an acceleration sensor, or an impact sensor may be used as the phase angle sensor 122 in accordance with a signal output method.

In the present embodiment, the phase angle sensor 122 may be an acceleration sensor that is installed in a direction of the gravity to output an electrical signal in accordance with the gravitational change. The phase angle sensor outputs a signal having a continuously variable value similar to a sine curve in accordance with the rotation of the wheel 10.

Referring to FIG. 3, the tire pressure detecting module 120 is provided in a radius direction of the wheel 10 to measure acceleration in the gravity direction. The tire pressure detection module 120 measures the acceleration in the radius direction of the wheel 10 to output only an acceleration component in the gravity direction except for acceleration components according to the movement of the vehicle.

When the tire pressure detecting module 120 is disposed at the highest position of the wheel 10, the gravity may be maximized, and thus, the phase angle sensor 122 may output a minimum value. On the other hand, when the tire pressure detecting module 120 is disposed at the lowest portion of the wheel 10, the gravity may be minimized, and thus, the phase angle sensor 122 may output a maximum value.

Thus, when the phase angle sensor 122 outputs the minimum value during the rotation of the wheel 10, the phase angle P is about 0 (zero) degree. On the other hand, when the phase angle sensor 122 outputs the maximum value, the phase angle P is about 180 degrees. Also, when the phase angle sensor 122 outputs a middle value, the phase angle P is about 270 degrees. The phase angle sensor 122 may calculate the phase angle P in accordance with the continuous output values.

The signal outputted from the phase angle sensor 122 is transmitted to the pressure detecting control unit 123 to convert an analog signal into a digital signal.

The pressure detecting battery 125 supplies power into the pressure detecting control unit 123, the pressure detecting sensor 121, the pressure detecting sensor 121, the phase angle sensor 122, and the pressure detecting transmission unit 124. Since the tire pressure detecting module 120 is not connected to electric devices of the vehicle through a wire, a self battery is required for the tire pressure detecting module 120. Thus, the pressure detecting battery 125 may serve as a power source for the tire pressure detecting module 120. The pressure detecting battery 125 detects a self-voltage to transmit the detected voltage value to the pressure detecting control unit 123. Since the voltage value of the pressure detecting battery 125 is transmitted into the control unit 140 in the state where the voltage value is included in the tire information, the control unit 140 may estimate a life-cycle of the pressure detecting battery 125.

The pressure detecting transmission unit 124 wirelessly transmits the tire information into the tire information receiving module 150. The pressure detecting transmission unit 124 outputs the tire information processed in the pressure detecting control unit 123 as an encoded radio frequency (RF) signal.

The pressure detecting control unit 123 receives the pressure value and/or temperature value of the tire 20 detected by the pressure detecting sensor 121 to process the received pressure value and/or temperature value into the tire information. The pressure detecting control unit 123 converts analog signals corresponding to the pressure value and/or temperature value of the tire 20, which are (is) outputted from the pressure detecting sensor 121, into digital signals. The pressure detecting control unit 123 may process the pressure value and/or temperature value into the tire information to transmit the tire information into the pressure detecting transmission unit 124.

The pressure detecting control unit 123 stores the unique identifier. The unique identifier may be different in each of the tire pressure detecting modules 120 and be expressed as a combination of numbers. The pressure detecting control unit 123 processes the stored unique identifier into the tire information to output the processed tire information.

The pressure detecting control unit 123 calculates a phase angle P of the wheel 10 by using the signal that is outputted from the phase angle sensor 122. The pressure detecting control unit 123 converts the analog signal outputted from the phase angle sensor 122 into the digital signal to calculate the phase angle P of the wheel 10.

The pressure detecting control unit 123 extracts a phase angle number matching the phase angle P of the wheel 10 among a plurality of phase angle numbers in which the wheel 10 is uniformly divided by a preset division value.

Referring to FIG. 3, a transmission position resolution is set by uniformly dividing the wheel 10 by using the preset division value. In the present embodiment, the preset division value may be eight, and the transmission position resolution may be given by phase angle numbers from number 0 to number 7 in a clockwise direction by dividing the wheel 10 at an angle of about 45 degrees.

In the present embodiment, the pressure detecting control unit 123 extracts a phase angle number [1] because the phase angle P matches a number [1] of the transmission position resolution when the wheel 10 detected by the phase angle sensor 122 has an angle of about 45 degrees.

The pressure detecting control unit 123 calculates the retransmission interval by using the extracted phase angle number. The pressure detecting control unit 123 multiplies a phase angle number by a preset time value and then adds a time value to calculate the retransmission interval.

If the retransmission interval is t_repeat, the preset time value is t_d, the extracted phase angle number is N, the retransmission interval may be calculated as follows:

$$\text{Retransmission interval } t\_repeat = t\_d + (N * t\_d)$$

The pressure detecting control unit 123 transmits the tire information at the retransmission interval t_repeat through the pressure detecting transmission unit 124 several times.

The pressure detecting control unit 123 processes the tire information. The tire information may include the unique identifier stored in the pressure detecting control unit 123, the pressure value and/or temperature value detected by the pressure detecting sensor 121, a voltage value detected by the battery 125, and various information.

Referring to FIG. 4, the tire information in accordance with the present embodiment sequentially processes and generates unique identifier, a pressure value, a voltage value, a temperature value, the number of times of retransmission, and a checksum. In accordance with embodiments, the tire information may further include a vehicle code that denotes a kind of vehicles, a sensor mode that denotes an operation mode of the sensor, and sensor information that denotes error information of the sensor.

The unique identifier is a number having a size of 32 bits as a number stored in the pressure detecting control unit 123. The pressure value is a value of the pressure of the tire 20 which is detected by the pressure detecting sensor 121 in order to be transferred to the pressure detecting control unit 123 and has a size of 16 bits. The voltage value is a value of voltage of the pressure detecting battery 125 which is detected by the pressure detecting battery 125 itself in order to be transferred to the pressure detecting control unit 123 and has a size of 16 bits. The temperature value is a value of the temperature of the tire 20 which is detected by the pressure detecting sensor 121 in order to be transferred to the pressure detecting control unit 123 and has a size of 16 bits.

The number of times of retransmission denotes the number of times of retransmitting the tire information at the retransmission interval t_repeat. The tire information receiving module 150 may be unable to receive the tire information transmitted by the pressure detecting transmission unit 124 due to various noises or errors. Therefore, the pressure detecting control unit 120 repeatedly transmits the tire information through the pressure detecting transmission unit 124, wherein the values in the tire information is not changed except for the number of times of retransmission.

The number of times of retransmission in the tire information is increased by 1 to be changed whenever the tire information is transmitted. The number of retransmission may have a size of 8 bits. In accordance with an embodiment, the number of times of retransmission is set. In the present embodiment, the tire information is transmitted three times. Therefore, the number of times of retransmission has a value of 0 to 2. The retransmission interval of the time information is determined as t_repeat that is calculated from the phase angle number.

The checksum is a value for checking integrity of data and preferably has a size of 8 bits.

In accordance with an embodiment, the order of the unique identifier, the pressure value, the voltage value, the temperature value, a displacement of the phase angle, the number of times of retransmission, and the checksum included in the tire information may be changed. One of the pressure value and the temperature value, or the voltage value, or the checksum may be excluded.

FIG. 5 is a block diagram of the control unit in accordance with an embodiment of the present invention.

A control unit (140) in accordance with an embodiment of the present invention includes a rotation information processing part 143 for receiving rotation information of each of the plurality of wheels (10) from a plurality of wheel rotation detecting modules 130 to process the rotation information, a tire information processing part 142 for receiving the tire information received by the tire information receiving module 150 to store and process the tire information, a time calculation part 144 for calculating a time or time displacement, and a control processing part 141 for automatically allocating a position of the tire pressure detecting module 120 from the plurality of tire information processed by the tire information processing part 142 and the rotation information processed by the rotation information processing part 143.

The rotation information processing part 143 receives the rotation information from the plurality of wheel rotation detecting modules 130. The rotation information processing part 143 accumulates the rotation information received from an arbitrary time point, according to a time. The rotation information processing part 143 stores the rotation information for each time point according to time information provided by the time calculation part 144.

For example, if the rotation information of the wheel 10 recorded at an arbitrary time point is 10 and the wheel 10 rotates 135 degrees so that the wheel rotation detecting module 130 outputs 36 pulses, the rotation information processing part 143 records the rotation information at the time of the 135 degree rotation of the wheel 10 as 46. Since 96 pulses are generated when the wheel 10 rotates 360 degrees, the rotation information is initialized to be 0 and is accumulated if the rotation information is greater than 96. If the rotation information recorded at an arbitrary time point is 94 and the wheel 10 rotates 45 degrees so that the wheel rotation detecting module 130 outputs 12 pulses, the control unit 140 records the rotation information at the time of the 45-degree rotation of the wheel 10 as 10.

The tire information processing part 142 calculates a number of the plurality of tire information received from the tire information receiving module 150 to store the calculated number. The tire information processing part 142 calculates the phase angle number by subtracting the preset time value from the received interval and then multiplying the resultant value by the time value.

Phase angle number $N=(t\_receive-t\_d)/t\_d$

The time calculation part 144 may include a resonant circuit to calculate a current time from a reference time or calculate a time displacement between different time points. The time calculation part 144 may provide time information to the rotation information processing part 143 so that the rotation information of each of the plurality of wheels 10 is stored for each time point. The time calculation part 144 may provide the time information to the tire information processing part 142 so that the phase angle number is calculated from receiving intervals of the plurality of tire information is calculated.

The control processing part 141 automatically assigns a portion of the tire pressure detecting module 120 from the phase angle number calculated by the tire information processing part 142 and the rotation information of the plurality of wheels 10.

The control processing part 141 matches a displacement of the calculated phase angle number with a displacement of the rotation information of each of the plurality of wheels 10 to automatically assign the position of the tire pressure detecting module 120.

According to a tire pressure detecting module and a tire pressure detecting system including the same, in accordance with the present invention, there are one or more advantageous effects as follows.

The first advantageous effect is that the retransmission interval of the tire information is calculated from the phase angle numbers given by uniformly dividing the phase angle of the wheel on which the tire is mounted to allow the control unit to reversely calculate the phase angle number from the receiving interval of the tire information.

The second advantageous effect is that the transmission packet may be simplified because information with respect to the phase angle or transmission time of the wheel is not transmitted.

The third advantageous effect is that the entire calculation may be simple because only the transmission interval of the received tire information is calculated.

Advantageous effects of the present invention are not limited to the above, and thus other effects not described herein could be clearly understood by a person skilled in the art from claims.

Although the tire pressure detecting module and the tire pressure detecting system comprising the same have been described with reference to the specific embodiments, it (they) is (are) not limited thereto. Therefore, it will be readily understood by those skilled in the art that various modifications and changes can be made thereto without departing from the spirit and scope of the present invention defined by the appended claims.

What is claimed is:

1. A tire pressure detecting module comprising:
   a phase angle sensor detecting a phase angle of a wheel;
   a pressure detecting sensor detecting a pressure and temperature of a tire;
   a pressure detecting control unit extracting a phase angle number matching the phase angle of the wheel that is detected by the phase angle sensor among a plurality of phase angle numbers that correspond to phase angles and are given from the highest position of the wheel in a clockwise direction by uniformly dividing a central angle of the wheel into a preset division, and calculating a retransmission interval by using the phase angle numbers; and a pressure detecting transmission part transmitting tire information comprising a pressure value or temperature value detected by the pressure detecting sensor at the retransmission interval several times.

2. The tire pressure detecting module of claim 1, wherein the pressure detecting control unit stores a unique identifier that is capable of identifying the tire pressure detecting module, and the tire information further comprises the unique identifier.

3. The tire pressure detecting module of claim 1, further comprising a pressure detecting battery supplying power into the phase angle sensor, the pressure detecting module, the pressure detecting control unit, and the pressure detecting transmission unit, wherein the tire information further comprises a voltage value of the pressure detecting battery.

4. The tire pressure detecting module of claim 1, wherein the tire information further comprises a retransmission number that is a transmitted number of the tire information.

5. The tire pressure detecting module of claim 1, wherein the pressure detecting control unit calculates the retransmission interval by multiplying a preset time value by the phase angle number and adding the preset time value.

6. A tire pressure detecting system comprising:

a tire pressure detecting module detecting a phase angle of each of a plurality of wheels and a pressure or temperature of a tire, extracting a phase angle number matching the detected phase angle of the wheel among a plurality of phase angle numbers that correspond to phase angles and are given from the highest position of the wheel in a clockwise direction by uniformly dividing a central angle of the wheel into a preset division, and calculating a retransmission interval from the phase angle number to transmit tire information comprising the detected pressure value or temperature value at the retransmission interval several times;

a wheel rotation detecting module detecting rotation information that is information with respect to a degree of rotation of each of the plurality of wheels;

a tire information receiving module receiving the tire information, which is transmitted several times from the tire pressure detecting module, several times; and a control unit calculating a phase angle number from a receiving interval of the tire information to automatically assign a position of the tire pressure detecting module from the phase angle number and the rotation information transmitted from the wheel rotation detecting module.

7. The tire pressure detecting system of claim 6, wherein the retransmission interval is calculated by multiplying a preset time value by the preset phase angle number and adding the time value, and the tire information receiving module calculates the phase angle number by subtracting the preset time value from the receiving interval to form a resultant value and dividing the resultant value by the preset time value.

* * * * *